United States Patent
Miyachi et al.

(10) Patent No.: US 8,963,388 B2
(45) Date of Patent: Feb. 24, 2015

(54) DRIVE UNIT WITH MOTOR AND CONTROL UNIT

(75) Inventors: Shuhei Miyachi, Okazaki (JP); Hiroshi Imai, Toyohashi (JP)

(73) Assignee: Denso Corporation, Kariya (JP)

( * ) Notice: Subject to any disclaimer, the term of this patent is extended or adjusted under 35 U.S.C. 154(b) by 323 days.

(21) Appl. No.: 13/469,207

(22) Filed: May 11, 2012

(65) Prior Publication Data

US 2012/0286605 A1 Nov. 15, 2012

(30) Foreign Application Priority Data

May 11, 2011 (JP) ................................ 2011-106364

(51) Int. Cl.
*H02K 5/22* (2006.01)
*H02K 11/00* (2006.01)
*B62D 5/04* (2006.01)

(52) U.S. Cl.
CPC .............. *B62D 5/0406* (2013.01); *H02K 5/225* (2013.01); *H02K 11/0073* (2013.01)
USPC ........................................................ 310/71

(58) Field of Classification Search
CPC ..... H02K 5/22; H02K 5/225; H02K 11/0068; H02K 11/0073; H01R 13/73; H01R 13/74; H01R 13/741
USPC ............ 310/71; 439/376, 527, 534, 544–546, 439/549–550, 552, 555, 562–563, 577
See application file for complete search history.

(56) References Cited

U.S. PATENT DOCUMENTS 3,836,885 A * 9/1974 Larsile ........................... 439/341
4,429,243 A * 1/1984 Crow ............................... 310/71
5,588,871 A * 12/1996 Salvaneschi ................... 439/469
5,876,246 A * 3/1999 Martin et al. .................. 439/557
5,912,541 A * 6/1999 Bigler et al. ................... 318/600
2003/0127921 A1 7/2003 Akutsu et al.
2004/0109772 A1* 6/2004 Ogawa et al. ............... 417/410.5
2008/0219867 A1* 9/2008 Sakata ........................ 417/410.1
2009/0079281 A1* 3/2009 Best et al. ........................ 310/71
2009/0203251 A1* 8/2009 Takahashi et al. ............. 439/376
2009/0250287 A1* 10/2009 Takashima et al. ........... 180/444

(Continued)

FOREIGN PATENT DOCUMENTS

JP 10248199 A * 9/1998 ............... H02K 5/22
JP 2000-217310 8/2000
JP 2000217310 A * 8/2000 ............. H02K 11/00

OTHER PUBLICATIONS

Office Action (5 pages) dated Jan. 6, 2014, issued in corresponding Chinese Application No. 201210144903.8 and English translation (6 pages).
Office Action (1 page) dated Jun. 5, 2014, issued in corresponding Japanese Application No. 2011-106364 and English translation (2 pages).

(Continued)

*Primary Examiner* — Burton Mullins
*Assistant Examiner* — Eric Johnson
(74) *Attorney, Agent, or Firm* — Nixon & Vanderhye P.C.

(57) ABSTRACT

A drive unit used in an electric power steering device has a motor and a control unit. A motor wire of the motor has a terminal, which is engaged with a power board side terminal of the control unit to electrically couple the motor and the control unit. In such structure, the motor and the control unit may be electrically coupled and decoupled, without the use of a special tool. Further, a terminal holder is disposed on an opening of the motor by a first short protrusion and a second short protrusion, thereby coupling the terminal to the motor.

4 Claims, 14 Drawing Sheets

(56) References Cited

U.S. PATENT DOCUMENTS

| | | | |
|---|---|---|---|
| 2010/0101889 A1* | 4/2010 | Yamaguchi et al. | 180/444 |
| 2010/0209266 A1* | 8/2010 | Ikeda et al. | 417/410.1 |
| 2011/0043082 A1* | 2/2011 | Billmann et al. | 310/68 R |
| 2013/0316558 A1* | 11/2013 | Kobayashi | 439/341 |

OTHER PUBLICATIONS

Office Action (5 pages) dated Jul. 8, 2014, issued in corresponding Chinese Application No. 201210144903.8 and English translation (8 pages).

* cited by examiner

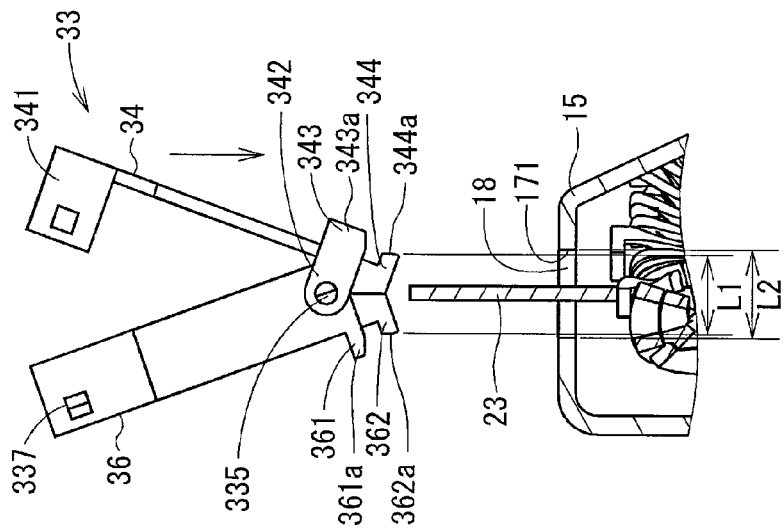
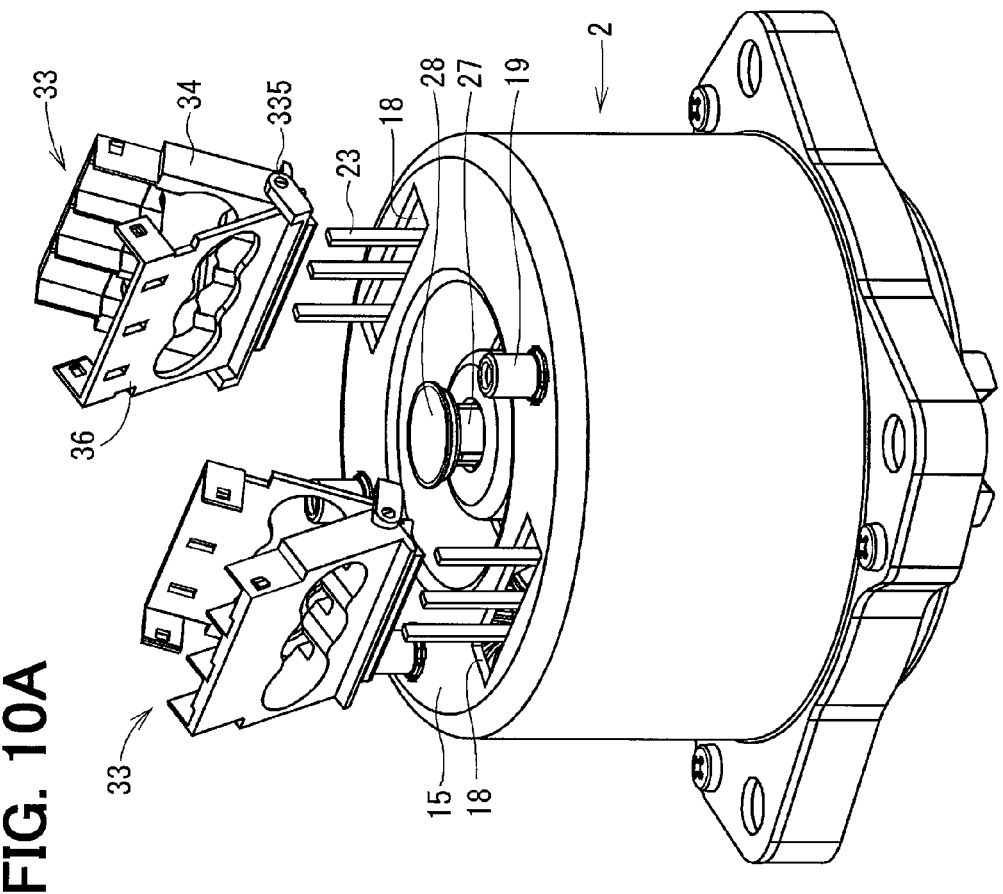

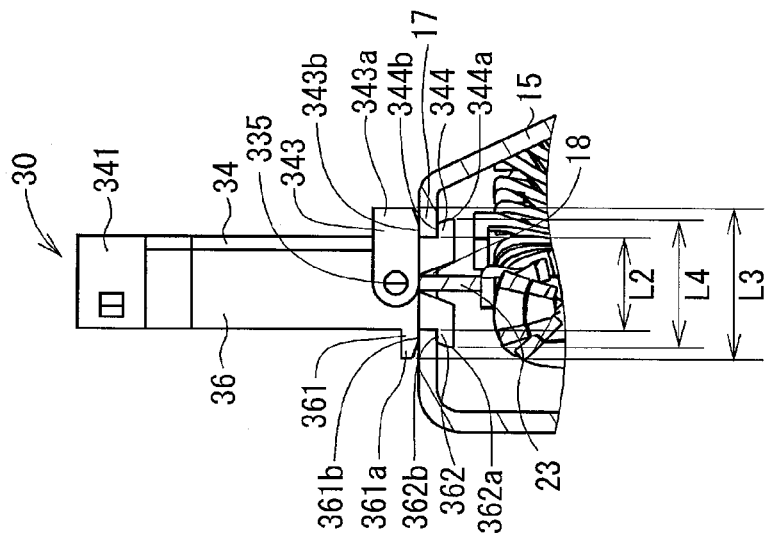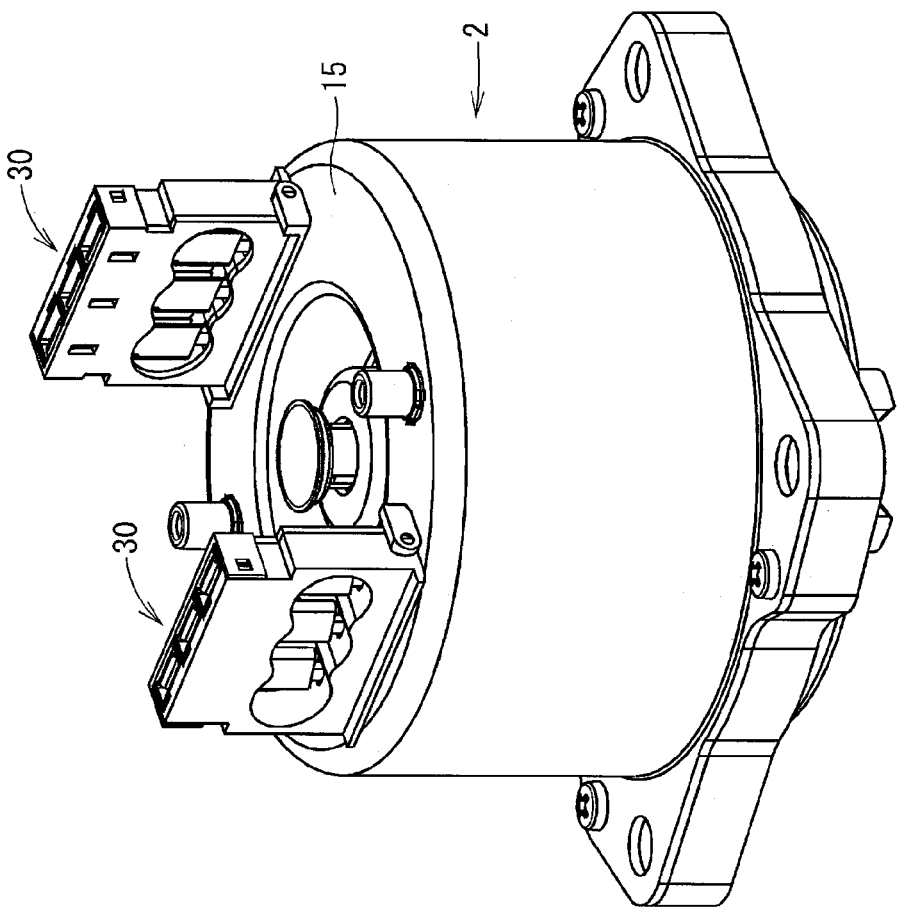

DRIVE UNIT WITH MOTOR AND CONTROL UNIT

CROSS-REFERENCE TO RELATED APPLICATION

This application is based on and claims the benefit of priority of Japanese Patent Applications No. 2011-106364 filed on May 11, 2011, the disclosure of which is incorporated herein by reference.

TECHNICAL FIELD

The present disclosure generally relates to a drive unit which has a motor and a control unit for controlling the motor in one body.

BACKGROUND

Conventionally, an electric power steering device having a drive unit is widely used, in which the drive unit assists a steering operation of a driver, and the drive unit has a motor and its control unit disposed in a combined manner. The electric power steering device disclosed in Japanese Patent Laid-Open No. 2003-204654 (JP '654) has an electrical connection between the motor and the control unit that is enabled by coupling a bus bar extending from the control unit to a winding wire terminal in a motor case by using a screw, thereby allowing a user to replace a broken part.

However, the structure of the electric power steering device in JP '654 does not allow the separation of the control unit from the motor without removing the screw that is used for electrical connection therebetween. Further, for removing the screw, the drive unit has to be removed from a column shaft that is connected to a steering wheel. In other words, such structure does not allow an easy removal of the control unit without first removing the drive unit from the column shaft.

SUMMARY

In an aspect of the present disclosure, the drive unit includes a motor, a control unit, an engaging unit, and a hold unit. The motor is housed in a motor case, where the motor case may have a cylindrical shape with a bottom wall disposed at one end. Additionally, the bottom wall may define an opening. The motor further includes a stator having a plurality of winding wires corresponding to multiple phases wound thereon, a rotor disposed inside of the stator, and a shaft disposed inside of and coupled to the rotor, such that the rotor and the shaft rotate relative to the stator as one. In addition, the motor may include a plurality of motor wires that electrically couple to the winding wires of the stator, and extend into the opening of motor case.

The control unit is disposed on one axial side of the motor, and has a semiconductor module that includes a switching element for switching electricity to the winding wires and a connection terminal that electrically couples to the switching element. In addition, the control unit includes a controller case to house the semiconductor module The engaging unit is disposed between the motor wire and the connection terminal, and is mechanically engagable with either the motor wire (23) or the connection terminal (371) to electrically couple the motor wire and the connection terminal. The hold unit holds or secures the engaging unit with either the motor wire or the connection terminal, thereby establishing an electrical connection between the motor and the control unit.

When the engaging unit engages with either the motor wire or the connection terminal, the motor wire is electrically coupled to the connection terminal. Without detaching the drive unit from the column shaft, when the engagement of the engaging unit with one of those parts is released, the motor wire and the connection terminal is electrically decoupled. In other words, without using a special tool, the motor and the control unit are electrically coupled and decoupled with ease.

When the motor and the control unit are attached to the column shaft by a screw that pierces the drive unit from the control unit side to the motor side, as provided in the prior art, it may not be possible to detach the motor and the control unit without removing the drive unit from the column shaft. According to the drive unit of the present disclosure, the control unit is attached to the motor on one side and the column shaft is attached to the motor on the other side. Therefore, with the help of the engaging unit, the motor and the control unit are coupled and decoupled with ease, and without causing any harm to other functions of the drive unit.

The drive unit described above is equipped with the engaging unit and the hold unit to hold/assist with the structural coupling between the engaging unit and one of the motor wire and the connection terminal. In addition the engaging unit holds/assists with the electrical coupling between the motor wire and the connection terminal. When the motor and the control unit are attached and detached, the engaging unit receives a force in an axial direction of the drive unit. The hold unit holds the engaging unit so that a relative position of the engaging unit against one of the motor and the control unit does not change. In such manner, the engaging unit securely releases mechanical engagement with the motor wire or the connection terminal, and securely disconnects electrical connection between the motor wire and the connection terminal. Further, when the motor and the control unit are reattached, the engaging unit securely enables mechanical engagement with one of the motor wire and the connection terminal, and securely enables electrical connection between the motor wire and the connection terminal.

In addition to the above configuration, the engaging unit is a terminal having an engagement portion to be engaged with the connection terminal, and the hold unit is a terminal holder being disposed fixedly on the opening of the motor case and houses the terminal.

In addition to the above configuration, the terminal holder has two parts, a first holder part and a second holder part. The first holder part has a first short protrusion at a base end to affix on the opening, which protrudes from a side that is opposite to a terminal holding side. The second holder part also has a second short protrusion at a base end to affix on the opening, which protrudes from a side that is opposite to a terminal holding side. Further, the second holder part has a pivot, which protrudes in a direction that is substantially perpendicular to the second short protrusion at a position closer to a center of the second holder part relative to the second short protrusion. The first holder part and the second holder part are coupled via the pivot in a rotatable manner, for opening and closing the terminal holder. When the terminal holder is in an open state, the first and second short protrusions are insertable into the opening of the motor case, and when the terminal holder is in a closed state, the first and second short protrusions couple with an inner edge of the opening.

When the terminal holder is disposed on the motor case, the terminal holder is inserted into the opening in the open state. A holder-fixed side of the terminal holder, which is on both sides of the "thin-plate-shape" holder, has the first short protrusion or the second short protrusion. In the open state, the terminal holder is insertable into the opening, since the distance between a tip face of the first short protrusion and a tip face of the second short protrusion are designed to be shorter than a width of the opening. When the terminal holder is closed after insertion into the opening, the distance between the tip face of the first short protrusion and the tip face of the second short protrusion becomes greater than the width of the opening, thereby fixing the terminal holder onto the opening. By devising such structure, the terminal holder and the terminal being held therein are prevented from being pulled out from the bottom wall of the motor case when the control unit is removed from the motor.

In addition to the above configuration, the first holder part has a first long protrusion, which protrudes from a side that is opposite to a terminal holding side, at a position that is closer to a center of the first holder part relative to the first short protrusion. The projecting length of the first long protrusion is longer than the projecting length of the first short protrusion. Further, the second holder part has a second long protrusion, which protrudes from a side that is opposite to a terminal holding side, at a position that is closer to a center of the second holder part relative to the second short protrusion. The projecting length of the second long protrusion is longer than the projecting length of the second short protrusion. When the terminal holder is in the closed state, the first and second long protrusions are positioned on an upper surface of the inner edge of the opening.

When the terminal holder is attached to the bottom wall of the motor case, to be put in the closed state, the first long protrusion and the second long protrusion are in abutment to the opening and an upper surface of the inner edge. In such case, the distance between a tip face of the first long protrusion and a tip face of the second long protrusion is designed to have a greater value than the width of the opening, thereby preventing the long protrusions from entering into an inside of the motor case through the opening. Therefore, by devising such structure, the terminal holder and the terminal being held therein are prevented from entering into the motor case.

In addition to the above configuration, when the terminal holder is in the open state, the tip face of the first/second short protrusions is substantially in parallel with an inner wall of the opening. By devising such structure, the tip face of the first/second short protrusions is not caught by the inner edge of the opening when the terminal is inserted into the opening, that is, when the tip face of the first/second short protrusions enters into the inside of the motor case through the opening. Further, by devising such structure, the terminal holder is inserted further/deeper into the inside of the motor case, relative to the other shape (e.g., a square shape) of a tip of the first/second short protrusions.

In addition to the above configuration, when the terminal holder is in the open state, an abutment face of the first/second long protrusions abutted to the upper surface of the inner edge of the opening is substantially in parallel with the inner edge of the opening. When the terminal holder is inserted into the opening in the open state, the first/second long protrusions abut to the upper surface of the inner edge of the opening. By devising such structure, i.e., the above-described parallel shape of the abutment face of the first/second long protrusions, it is advantageous in terms of a deeper insertion of the terminal holder into the inside of the motor case, relative to a tip of the longer protrusions having the square shape.

BRIEF DESCRIPTION OF THE DRAWINGS

Other objects, features and advantages of the present invention will become more apparent from the following detailed description disposed with reference to the accompanying drawings, in which:

FIGS. 10A and 10B are illustrations of an assembly method of the connector of the drive unit of the present disclosure;

FIGS. 14A and 14B are illustrations of the assembly method of the connector of the drive unit subsequent to FIG. 13.

DETAILED DESCRIPTION

Details are discussed regarding the plural embodiments of the present disclosure based on the drawings as follows. Further, like parts have like numbers in the following embodiments, with the details of each of such parts provided only for the first appearance in the embodiment.

One Embodiment

Details are discussed regarding a drive unit 1 for the first embodiment of the present disclosure based on FIGS. 1 to 14B.

Figure 1:
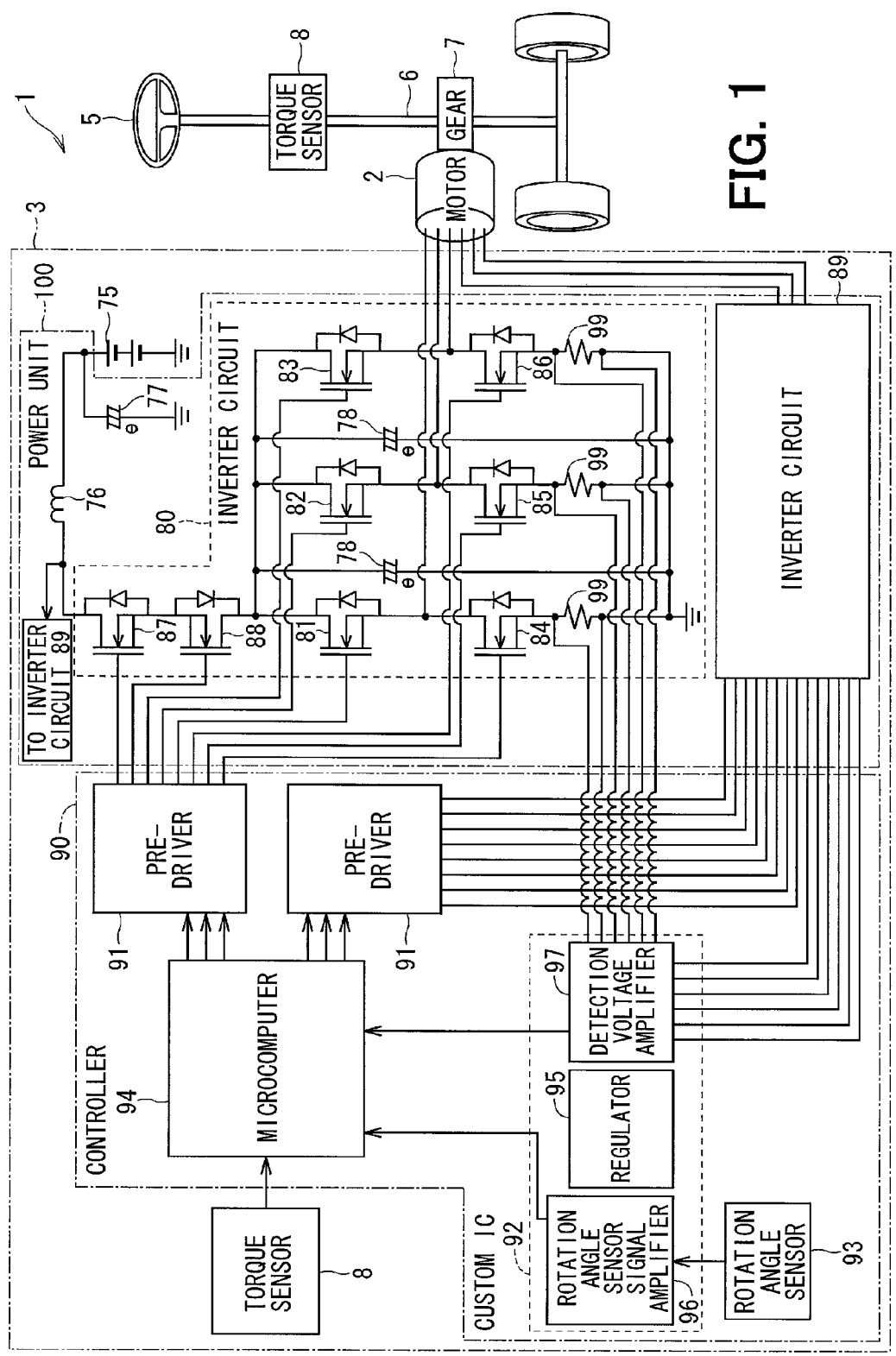
FIG. 1 is a circuit diagram of an electric power steering device having a drive unit of the present disclosure.

The drive unit 1 is applied to an electric power steering device (i.e., "EPS" hereinafter). The drive unit 1 includes a motor 2 and a control unit 3. With reference to FIG. 1, details regarding the electrical configuration of EPS is described. The drive unit 1 generates a rotation torque and applies such torque on a column shaft 6 through a gear 7, which serves as a rotation axis of a steering wheel 5 of the vehicle, for assisting the steering operation by using the steering wheel 5. When the steering wheel 5 is operated by a driver, the generated steering operation torque of the column shaft 6 is detected by a torque sensor 8. In addition, speed of the vehicle is acquired from control area network (CAN). The steering operation torque detected by the torque sensor 8 and the speed of the vehicle provided by the CAN are used to determine the necessary steering assist that needs to be provided by the drive unit 1. The control provided by the drive unit 1, is not limited to EPS, but may also be used in other applications, such as anti-drifting control to automate a position of a vehicle within a lane, automate parking, or an auto-pilot of the vehicle itself.

The motor 2 is a three-phase brushless motor that rotates the gear 7 in a forward direction and a reverse direction (i.e., clockwise or counterclockwise direction). The operation of the motor 2 is controlled by the control unit 3, through supply of electricity and a feedback from the operation of the motor 2. The control unit 3 has a power unit 100 to supply a drive electric current for driving the motor 2 and a controller 90 to control driving of the motor 2.

The power unit 100 has a choke coil 76 on a power supply line from a power source 75, a capacitor 77, and two inverters 80, 89. Two inverters 80, 89 have the same configuration. Thus, only the inverter 80 is described.

The inverter 80 has MOSFETs 81, 82, 83, 84, 85, 86 (i.e., a metal-oxide-semiconductor field-effect transistor, or "MOS" hereinafter), which is a kind of field effect transistor. MOSs 81, 82, 83, 84, 85, 86 control its conductivity between the source and the drain based on a gate voltage, which is turned ON (i.e., conducting) or OFF (i.e., intercepted). Further, MOSs 81, 82, 83, 84, 85, 86 serve as "a switching element."

MOS 81 has its drain coupled to the power supply line, and has its source coupled to the drain of MOS 84. The source of MOS 84 is coupled to the ground. The connection point between MOS 81 and MOS 84 is coupled to a U phase coil of the motor 2.

MOS 82 has its drain coupled to the power supply line, and has its source coupled to the drain of MOS 85. The source of MOS 85 is coupled to the ground. The connection point between MOS 82 and MOS 85 is coupled to a V phase coil of the motor 2.

MOS 83 has its drain coupled to the power supply line, and has its source coupled to the drain of MOS 86. The source of MOS 86 is coupled to the ground. The connection point between MOS 83 and MOS 86 is coupled to a W phase coil of the motor 2.

Further, the inverter 80 has power relays 87, 88. The power relays 87, 88 are provided as a MOSFET that is similar to MOSs 81, 82, 83, 84, 85, 86. The power relays 87, 88 are disposed between MOSs 81, 82, 83 and the power source 75, and can intercept an electric current that may flow at a time of abnormality. More practically, the power relay 87 is disposed to intercept an electric current flowing toward the motor 2 side when a snapping trouble or a short-circuit trouble occurs. Further, the power relay 88 is disposed for protection of reverse connection, preventing an electric current flowing in a reverse direction.

A shunt resistor 99 is electrically coupled between MOSs 84, 85, 86 and the ground. The electric current/voltage flowing through or applied on each of the U phase coil, the V phase coil, and the W phase coil is determined by detecting the voltage applied on the shunt resistor 99.

The choke coil 76 and the capacitor 77 are electrically coupled to a point between the power source 75 and the power relay 87. The choke coil 76 and the capacitor 77 constitute a filter circuit, and reduces a noise from other devices that share the power source 75 with the drive unit 1. Further, a noise from the drive unit 1 to the other devices sharing the power source 75 with the drive unit 1 is also reduced by such filter circuit.

A capacitor 78 is coupled to a point between the power supply side of MOSs 81, 82, 83 and the ground, which are on a power source line side. The capacitor 78 assists power supply for MOSs 81, 82, 83, 84, 85, 86 by storing an electric charge, and/or suppresses noise components, such as a surge voltage.

The controller 90 includes a pre-driver 91, a custom IC 92, a rotation angle sensor 93 serving as a rotation detecting element, and a microcomputer 94. The custom IC 92 includes a regulator unit 95, a rotation angle sensor signal amplifier 96 and a detection voltage amplifier 97 as function blocks.

The regulator unit 95 is a stabilization circuit stabilizing a power supply. The regulator unit 95 stabilizes a power supply supplied to various parts. For example, an operation of the microcomputer 94 is stabilized by a stable voltage of 5 volts from the regulator unit 95.

The rotation angle sensor 93 detects a rotation position signal of the motor 2, and outputs such signal to the rotation angle sensor signal amplifier 96. The rotation angle sensor signal amplifier 96 amplifies the rotation position signal, and outputs the amplified signal to the microcomputer 94.

The detection voltage amplifier 97 detects a voltage between both ends of the shunt resistor 99, and outputs the detected voltage to the microcomputer 94 after amplifying it.

The rotation position signal of the motor 2 and the voltage of shunt resistor 99 are transmitted to the microcomputer 94. Further, the microcomputer 94 receives a steering operation torque signal from the torque sensor 8 and the vehicle speed information via CAN. To provide the necessary assist for the steering operation, the microcomputer 94 controls the inverter 80 through the pre-driver 91 according to the rotation position signal of the steering wheel and the vehicle speed, when the steering operation torque signal and the vehicle speed information are received. More practically, the microcomputer 94 controls the inverter 80 through the pre-driver 91 by turning respective MOSs 81, 82, 83, 84, 85, 86 ON or OFF. In other words, because six MOSs 81, 82, 83, 84, 85, 86 have their gates coupled to the six output terminals of the pre-driver 91, MOSs 81, 82, 83, 84, 85, 86 are turned ON or OFF by changing the gate voltage by using the pre-driver 91.

Further, the microcomputer 94 controls the inverter 80 based on the voltage of the shunt resistor 99 provided by the detection voltage amplifier 97 in order to approximate, to a sine wave, a wave shape of an electric current supplied for the motor 2. Further, the controller 90 controls the inverter 89 in the same manner as it controls the inverter 80.

Figure 2:
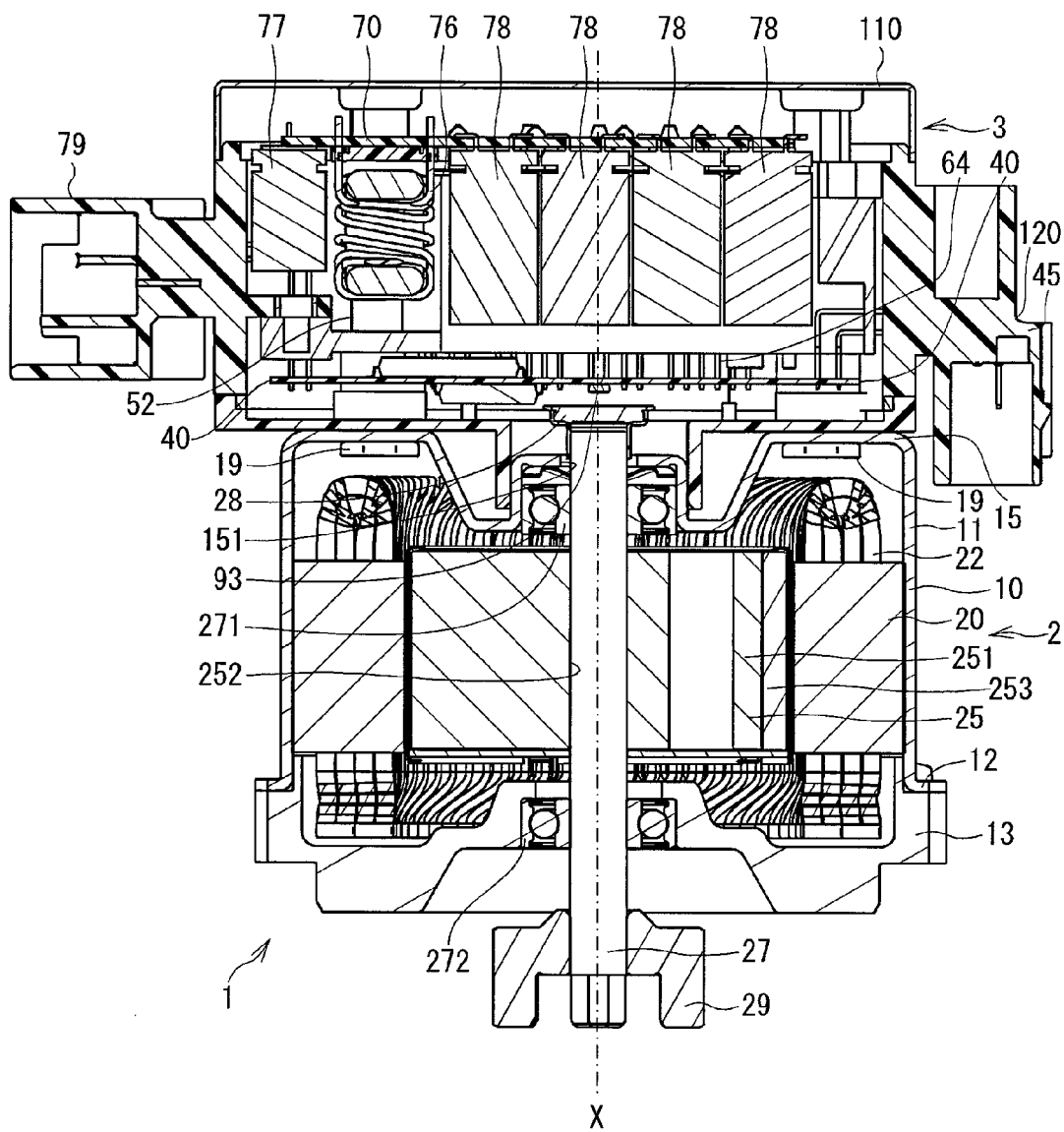
FIG. 2 is a cross-section of the drive unit along line II-II of the drive unit 1 of FIG. 4.
Figure 3:
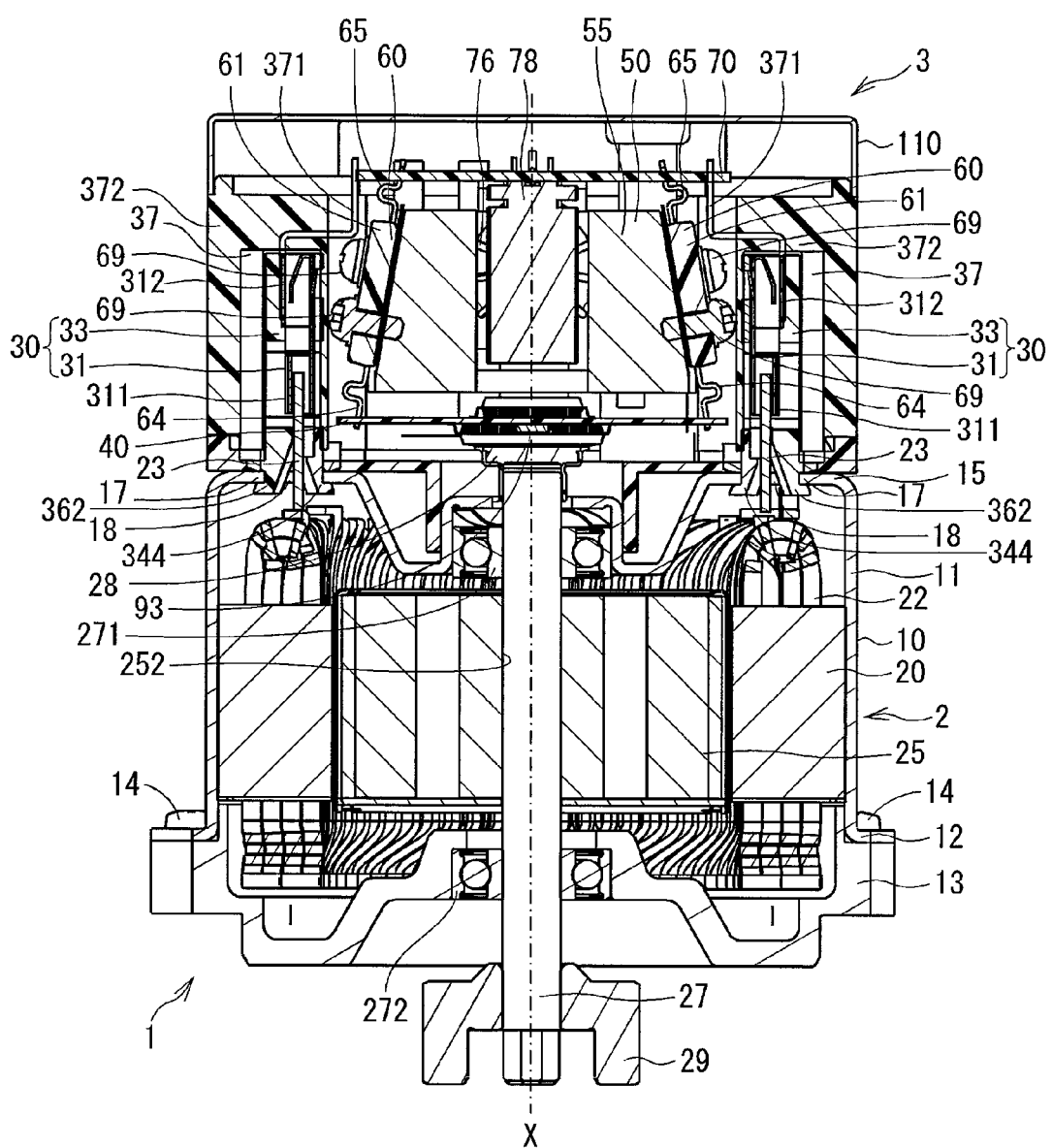
FIG. 3 is a cross-section of the drive unit along line III-III line of the drive unit 1 of FIG. 4.
Figure 4:
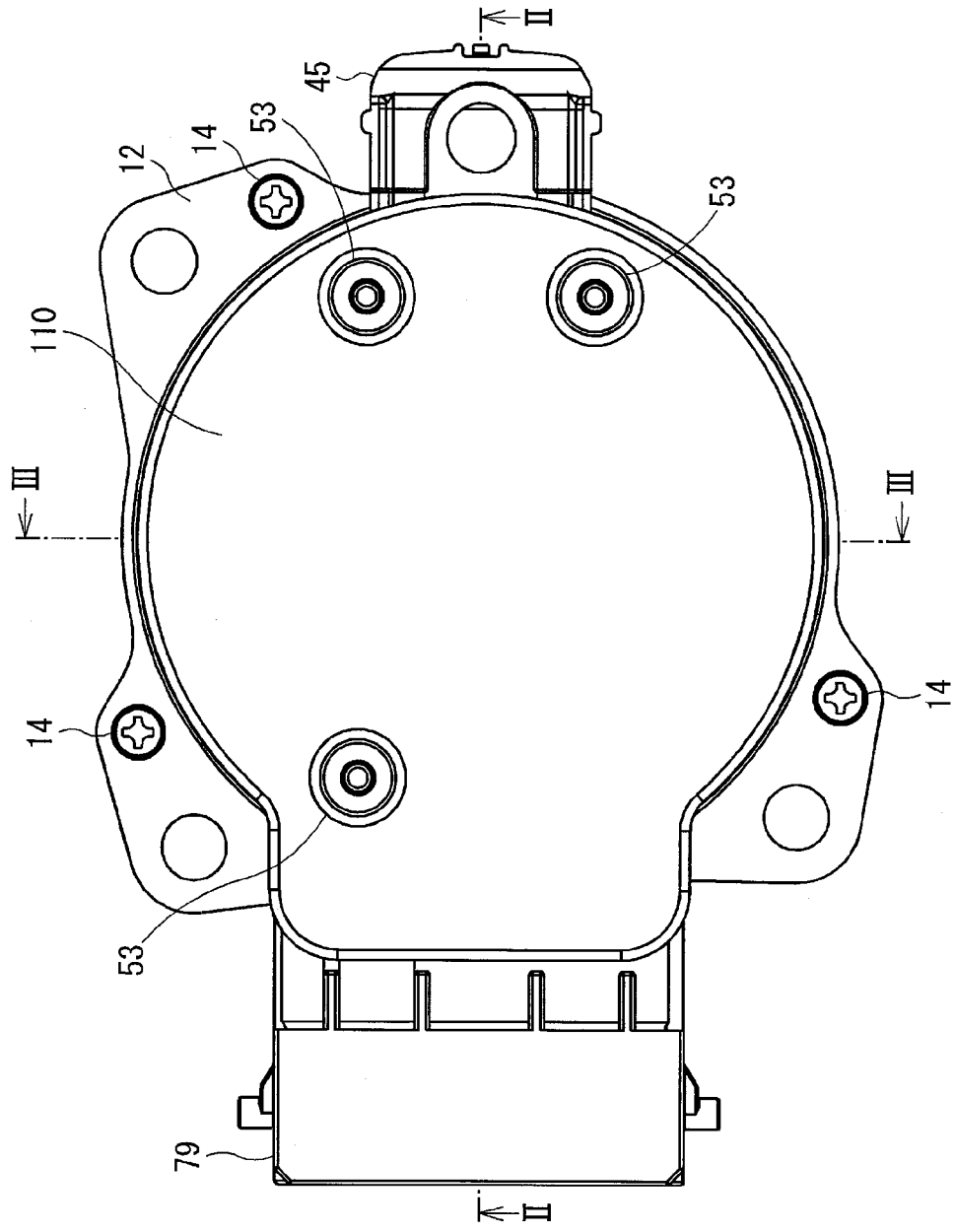
FIG. 4 is a top view of the drive unit of the present disclosure.
Figure 5:
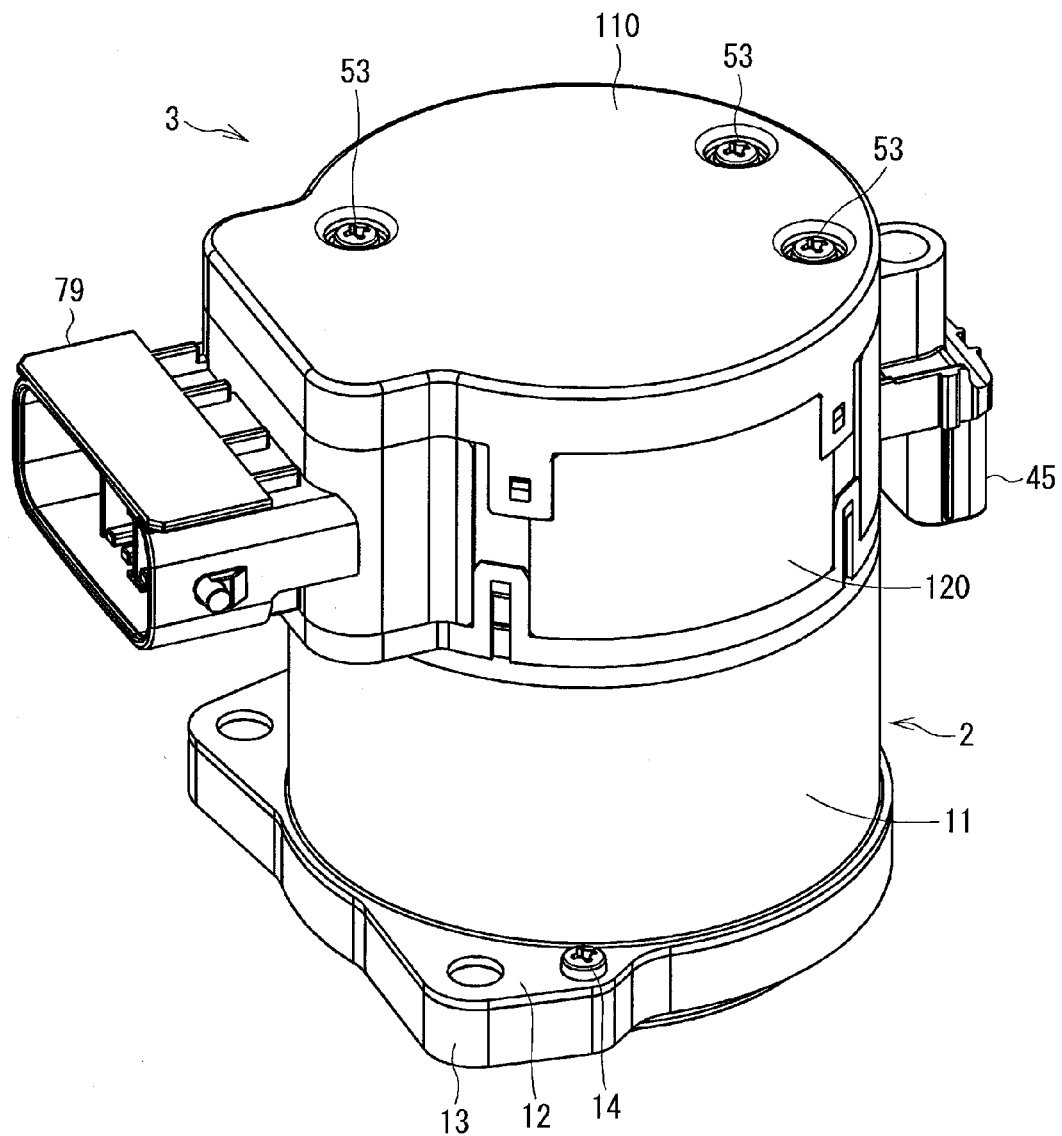
FIG. 5 is a perspective view of the drive unit of the present disclosure.
Figure 6:
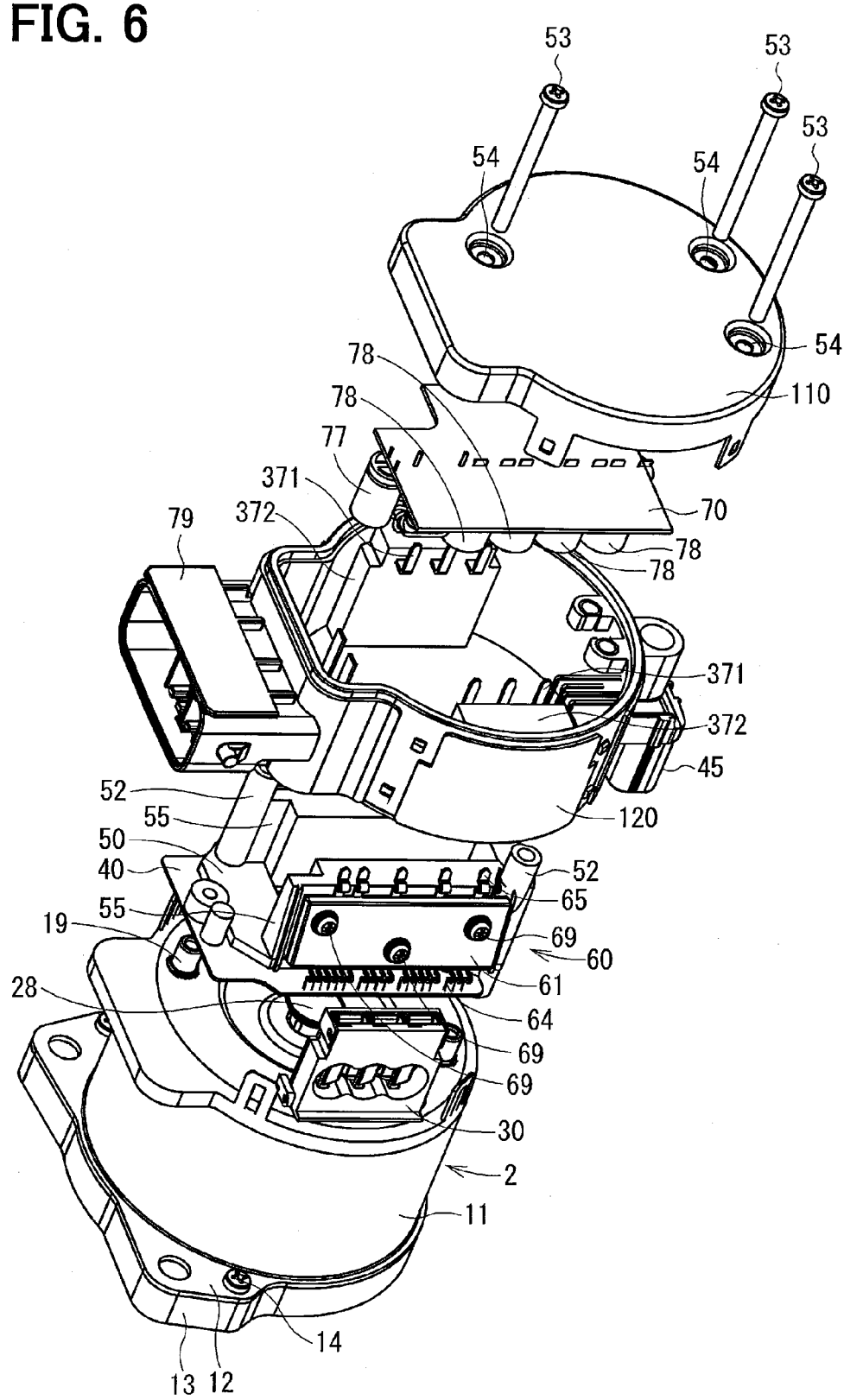
FIG. 6 is an exploded perspective view of the drive unit, viewed from a control unit side of the present disclosure.
Figure 7:
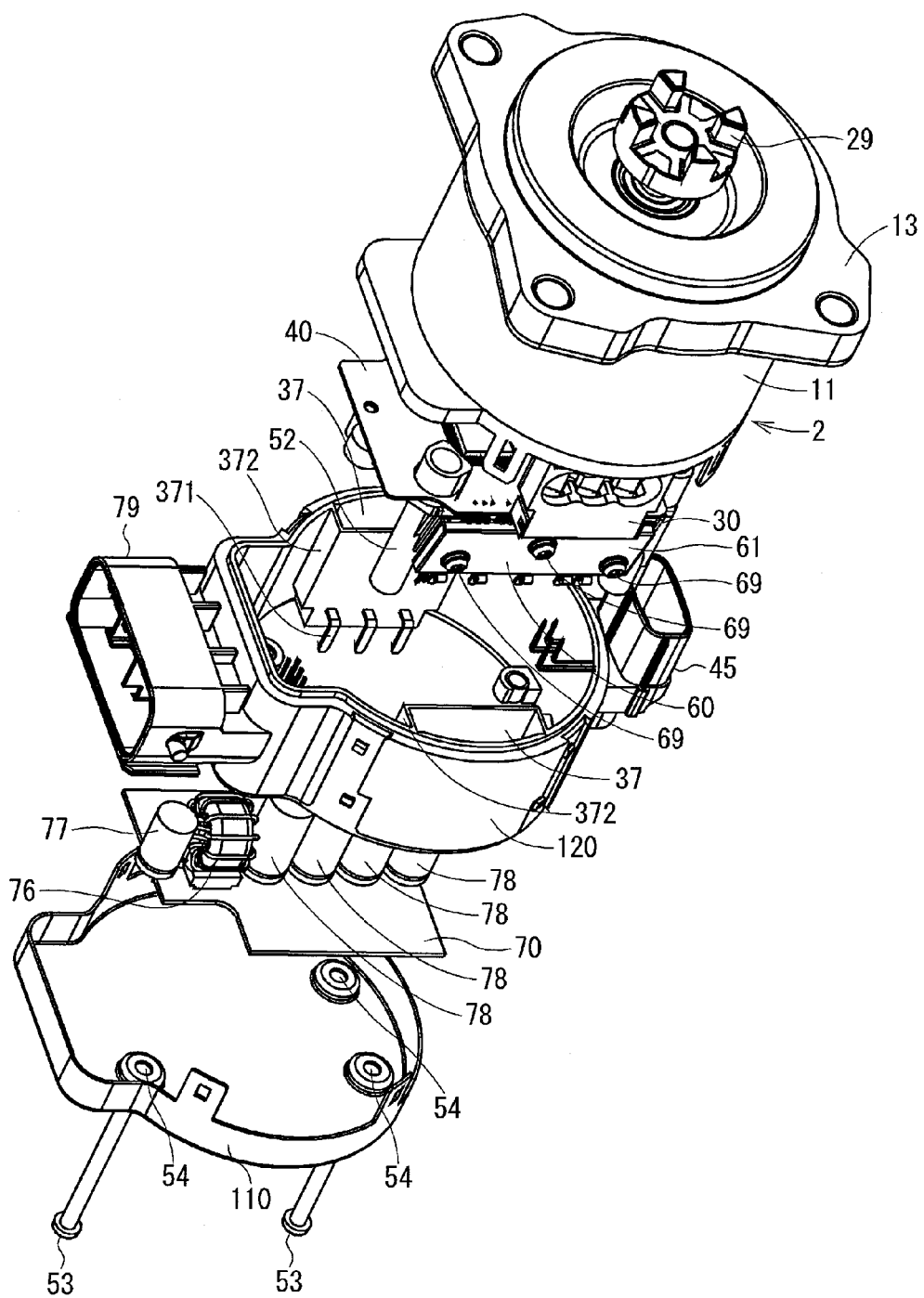
FIG. 7 is an exploded perspective view of the drive unit, viewed from a motor side, of the present disclosure.

With reference to FIGS. 2 to FIG. 14B, the structure of the drive unit 1 in the present disclosure is described. FIG. 2 is a cross-section along line II-II of the drive unit 1 in FIG. 4, where FIG. 4 provides a top view of the drive unit 1. FIG. 3 is a cross-section along line III-III line of the drive unit 1 in FIG. 4. FIG. 5 is a perspective view of the drive unit 1, and FIG. 6 and FIG. 7 are exploded perspective views of the drive unit 1. As shown in FIG. 2 and in FIG. 3, the drive unit 1 of the present embodiment has the control unit 3 disposed on one end of the motor 2, to form a stacking structure of the motor 2 and the control unit 3.

The motor 2 includes a motor case 10, a stator 20 having a winding wire 22 wound thereon, a rotor 25, and a shaft 27. An outline of the motor 2 is defined by the motor case 10. The motor case 10 is formed by a circumference wall 11 and a control-unit-side wall 15 to have a closed-end cylindrical form. The motor case 10 may be formed of metal or the like. On the end opposite of the control-unit-side wall 15, the circumference wall 11 protrudes outward to form a brim part 12, and an end frame 13 is affixed thereon by way of a fastener, such as a screw 14. The end frame 13 may be made of metal such as aluminum.

A column 19 is disposed on the control-unit-side wall 15 of the motor case 10. The column 19 may be made of aluminum or the like, and has a female screw part that has a female screw groove on its inner-surface and has a closing part. The female screw part protrudes from the outer-surface of the control-unit-side wall 15, such that when the drive unit is in an assembled condition, the female screw part extends into the control unit 3 and is aligned with a cylinder member 52, which is adjacent to a heat sink 50 of the control unit 3. The other end of the cylinder member 52 extends and abuts to the inside of a cover member 110 of the control unit 3. The cylinder member 52 is aligned such that the inside of the cylinder member 52 is aligned with a screw hole 54 on the cover member 110. In such manner, as shown in FIG. 6, a through bolt 53 engages with the female screw part of the column 19 through the screw hole 54 and the inside of the cylinder member 52. In other words, the motor 2 and the control unit 3 are coupled via the through bolt 53.

With continuing reference to FIGS. 2 and 3, the stator 20 is arranged inside of the motor case 10. The stator 20 may have 60 pieces of a radially-inwardly projecting pole. The projecting pole has a layered core of thin plates that are made of magnetic material and an insulator that is engaged on an axial outside of the layered core. The insulator has the winding wire 22 wound thereon. The winding wire 22 corresponds to each of a U phase coil, a V phase coil and a W phase coil, to form three phase winding wires.

A motor wire 23 extends from the winding wire 22. The motor wire 23 extends from an attachment hole 18 of the control-unit-side wall 15 into the control unit 3. The control-unit-side wall 15 defines the attachment hole 18, which serves as an "opening," by an attachment hole portion 17, where the attachment hole portion 17 is provided as an inner edge of the control unit-side wall 15.

The motor wire 23 is fixed onto a base portion 311 of a terminal 31, which serves as an "engaging unit." The terminal 31 is held by a terminal holder 33, which serves as a "hold unit" (FIG. 3). Additionally, an engaging portion 312, which is on the other end of the terminal 31 relative to the base portion 311, engages with a power board terminal 371, which serves as a "connection terminal" and is electrically coupled to the power board 70 (FIG. 6). The power board terminal 371 has one end electrically coupled to the power board 70, and has the other end projected into a connector accommodation space 37 that houses the terminal holder 33. Further, one end of the terminal holder 33 on the motor 2 side is engaged with the attachment hole portion 17. The structure of a connector 30 comprising of the terminal 31 and the terminal holder 33 is described later.

The rotor 25 is disposed inside of the stator 20, and is rotatable relative to the stator 20. The rotor 25 may have cylindrical shape and is made of a magnetic material, such as iron. The rotor 25 has a rotor core 251 and a permanent magnet 253 attached on a radial outside surface of the rotor core 251. The permanent magnet 253 has an N pole and an S pole arranged in turns.

The rotor core 251 defines a shaft hole 252 on an inner radial center of the rotor core 251. The shaft 27 is affixed to the shaft hole 252, and the shaft 27 is rotatably supported by a bearing 271 on the motor case 10 and a bearing 272 on the end frame 13. The shaft 27 can thus rotate with the rotor 25 relative to the stator 20 (i.e. the stator remains stationary while the shaft 27 and rotor 25 rotate within the stator 20 and about a center axis X). The control unit 3 side of the shaft 27 extends into a shaft hole 151 defined at the radial center of the control-unit-side wall 15 of the motor case 10, such that the shaft hole 151 is aligned with the shaft hole 252 of the rotor core 251. Accordingly, the end of the shaft 27 on the control unit 3 side is exposed from the motor case 10. Additionally, the diameter of the shaft hole 151 is greater than the outer diameter of the shaft 27, so that the motor case 10 does not interfere with the rotation of the shaft 27.

The end of the shaft 27, which is closest to the control unit 3, has a magnet 28 that rotates with the shaft 27. The magnet 28 is fixed on a magnet holder disposed on the shaft 27 and is coaxial with the shaft 27. The magnet 28 is exposed from the motor case 10 (FIG. 7). The magnet 28 is positioned in proximity to the surface of the control board 40 that faces the motor 2, such that the shaft 27 does not penetrate the control board 40.

Further, the shaft 27 has an output end 29 that extends past the end frame 13. (i.e opposite end of the control unit 3). The output end 29 extends into a gear box (not shown) that houses the gear 7 (FIG. 1). The shaft 27 engages with the gear 7 by way of the output end 29, accordingly, the gear 7 receives an output torque from the output end 29 of the shaft 27.

With continuing reference to FIGS. 2 and 3, detail regarding the control unit 3 is described in the following. The control unit 3 includes the control board 40, the heat sink 50, a power module 60 serving as the semiconductor module, the power board 70, the cover member 110, and an ECU housing 120. The cover member 110 and the ECU housing 120 are equivalent to a "controller case" in claims.

The control unit 3 has a control connector 45 that couples the control unit 3 with external components and a power connector 79. Majority of the components of the control unit 3 are provided within a circular outer boundary of the drive unit 10, except for certain parts that are primarily positioned external to and protrude from the ECU housing 120, such as the power connector 79. In addition, as shown in FIG. 3, the control unit 3 is arranged to have the heat sink 50 and the power module 60 substantially between the control board 40 and the power board 70, where the control board 40 is provided on the motor 2 side of the control unit 3.

The control board 40 may be provided as four levels of boards formed by a glass epoxy, and is formed in a board shape, such that the control board 40 may partially or substantially fit an area relative to motor case area. Various electronic parts constituting the controller 90 are disposed on the control board 40. Specifically, the pre-driver 91, the custom IC 92, and the microcomputer 94 are disposed on the side of the control board 40 that faces the power board 70. Further, the rotation angle sensor 93 is disposed on the side of the control board 40 that faces the motor 2. The rotation angle sensor 93 is disposed at a position facing the magnet 28. Further, the magnet 28 and the rotation angle sensor 93 are arranged coaxially on an axial rotation line of the shaft 27 and rotor 25. The rotation angle sensor 93 detects an angle of rotation of the shaft 27 by detecting the change of the magnetic field caused by the rotation of the magnet 28, which rotates with the shaft 27 and the rotor 25 as one body.

On the control board 40, a through hole is formed along the periphery of the control board 40 to couple to a control terminal 64 of the power module 60. Further, the control board 40 is coupled to the control connector 45.

With reference to FIG. 2, the control connector 45 is positioned off of an outer surface of the ECU housing 120, such that it extends in a direction parallel to the center axis X towards the motor 2. The control connector 45 is positioned adjacent to the outer surface of the motor case 10, and a wiring for receiving an input of signals, such as signals from the CAN, is connectable to the connector 45 from a direction along an axis of the motor 2 from the motor 2 side. In the present embodiment, the control connector 45 has an opening directed towards the motor 2 side of the drive unit 1 (FIG. 2).

The heat sink 50 may be made of a material having high heat conductivity, such as aluminum. A base-surface of the heat receiving portion 55, which does not have the control connector 45, faces the control board 40, such that the heat receiving portion 55 is positioned in a direction that is substantially perpendicular to the control board 40 or the control-unit-side wall 15. Additionally, a longitudinal-surface of the heat receiving portion 55 is perpendicular to the base-surface and substantially parallel to the center axis X. There are two heat receiving portions 55 disposed in parallel with each other, and along each of the two heat receiving portions 55, the power module 60 is disposed.

The power module 60 is vertically positioned on an outer-surface of the heat sink 50. Between the power module 60 and the heat sink 50, a heat radiation sheet (not illustrated) is disposed. The power module 60 with the heat radiation sheet is attached to the heat sink 50 by way of a fastener, such as a screw 69. In such manner, the power module 60 is held by the heat sink 50 with the heat radiation sheet interposed therebetween. The heat produced from the power module 60 is dissipated to the heat sink 50 through the heat radiation sheet.

Further, though not illustrated, one side of the power module 60 on the heat receiving portion 55 side has a part of the wiring pattern exposed from a mold part 61 of the power module 60 as a metal radiation part, for contacting and efficiently dissipating heat to the heat receiving portion 55 of the heat sink 50. The heat radiation sheet conducts heat from the power module 60 to the heat receiving portion 55, and maintains insulation of the heat receiving portion 55 from the power module 60.

The power module 60 includes MOSs 81, 82, 83, 84, 85, 86, which are used as a switching element for switching supply of an electric current to the winding wire. The power module 60 also includes MOSs 81, 82, 83, 84, 85, 86, 87, 88 and the shunt resistor 99, which are electrically coupled by way of, for example, copper wires, and is molded by the mold part 61.

A relation between the power modules 60 and the circuit in FIG. 1 is now described. One of the power modules 60 corresponds to the inverter 80 (FIG. 1), and has MOSs 81, 82, 83, 84, 85, 86, the power relays 87, 88, and the shunt resistor 99 as shown in FIG. 1. In other words, the present embodiment has MOSs 81, 82, 83, 84, 85, 86, the power relays 87, 88 and the shunt resistor 99 molded as one body by a resin mold. The other one of the power module 60 corresponds to the inverter 89, and has MOS, a power relay and a shunt resistor for constituting the inverter 89. Thus, in the present embodiment, one power module 60 corresponds to one system of an inverter circuit. Further, one heat receiving portion 55 is disposed corresponding to one power module 60 that constitutes one drive system.

The power module 60 has the control terminal 64 and a power terminal 65 projecting from the mold part 61. The control terminal 64 is formed on a face on an end of the mold part 61, which is perpendicular to the heat receiving portion 55 of the heat sink 50. Further, the power terminal 65 is formed in parallel with the face having the control terminal 64. In the present embodiment, the power module 60 has the control terminal 64 arranged on the control board 40 side, and has the power terminal 65 arranged on the power board 70 side, both residing on the heat receiving portion 55 of the heat sink 50 with its orientation vertically aligned to the heat receiving portion 55. In other words, the control terminal 64 protrudes from the control board 40 side, and the power terminal 65 protrudes from the power board 70 side.

The control terminal 64 is inserted into a through hole of the control board 40, and is electrically coupled to the control board 40 by way of, for example, soldering. Through the control terminal 64, a control signal from the control board 40 is transmitted to the power module 60. Further, the power terminal 65 is inserted into a through hole formed on the power board 70, and is electrically coupled to the power board 70 by way of, for example, soldering. An electric current supplied for the winding wire 22 through the power terminal 65 is then supplied for the power module 60.

The power board 70 may be formed by a glass epoxy, and has four layers of thick copper pattern, to have a board shape, such that the power board 70 may partially or substantially fit an area relative to motor case area. The power board 70 has a power wire formed thereon that allows a winding wire electric current to flow to the winding wire 22 through the power board terminal 371 and the terminal 31.

The choke coil 76 and the capacitors 77, 78 are disposed on the side of the power board 70 that faces the control board 40 (i.e. the motor 2 side). The choke coil 76 and the capacitors 77, 78 are disposed in a space formed in an inside of the heat sink 50. Further, in an axial direction of the motor 2, the choke coil 76 and the capacitors 77, 78 are disposed at a position between the power board 70 and the control board 40.

The choke coil 76 is formed in the shape of a cylinder which has a longitudinal (i.e., axial) dimension being shorter than a radial dimension that is taken along the radius of the cylinder. The choke coil 76 is arranged so that the axis of the coil 76 is substantially perpendicular to an axis of the shaft 27.

Both of the capacitors 77, 78 are aluminum electrolytic capacitors. Further, the capacity of four capacitors 78 is larger than the capacity of the capacitor 77. Further, the types of the capacitors 77, 78 are not only the aluminum electrolytic type, but may also be other types of capacitors.

Further, the power connector 79 is coupled to the power board 70. The power connector 79 is formed on an outer wall of the ECU housing 120. In the present embodiment, the power connector 79 is disposed on the other side of the control connector 45 across the rotation axis of the motor 2 (FIGS. 2 and 5). The power connector 79 is coupled to the power source 75, with its wiring connectable in a substantially perpendicular direction against a rotation axis of the drive unit 1. Through such connection, the electricity is supplied from the power source 75 via the power connector 79 for the power board 70. Further, the electricity from the power source 75 is supplied for the winding wire 22 wound on the stator 20, through the power connector 79, the power board 70, the power module 60, and the motor wire 23.

With reference to FIGS. 6 and 7, the connector accommodation space 37 is defined inside of the ECU housing 120. The connector accommodation space 37 is formed at two positions inside of the ECU housing 120 and next to the outer wall, such that the outer wall closest to the connector accommodation space 37 does not have the control connector 45 or the power connector 79. The connector accommodation space cover 372 is formed substantially as a rectangular member with a bottom and an opening that opens towards the motor 2 side. The power board terminal 371 is disposed on the control unit 3 side of the connector accommodation space cover 372.

Figure 8A:
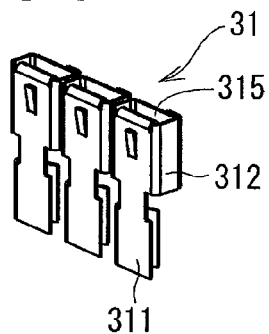
FIGS. 8A and 8B are perspective views of a terminal of the drive unit of the present disclosure.
Figure 8B:
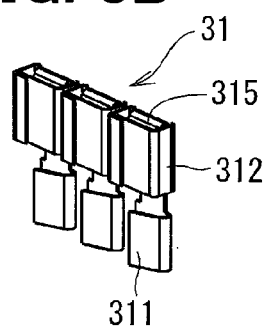
Figure 8C:
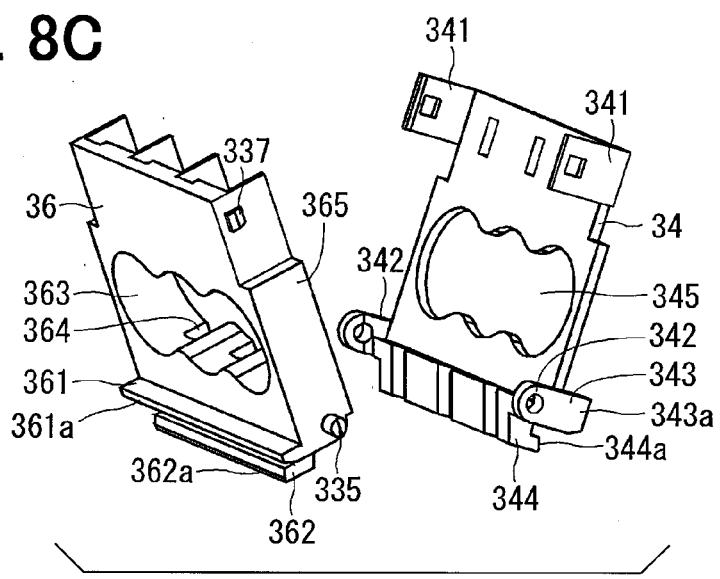
FIGS. 8C and 8D are perspective views of a terminal holder of the drive unit of the present disclosure.
Figure 8D:
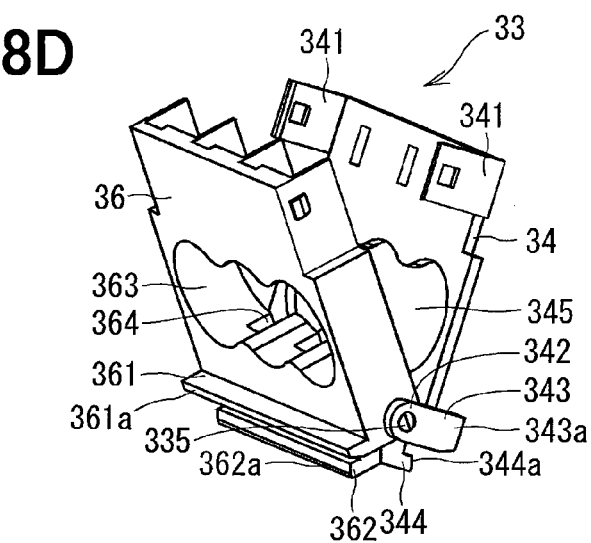
Figure 9A:
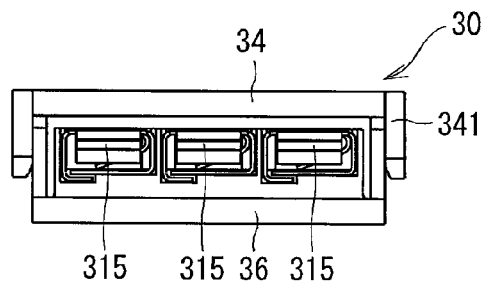
FIG. 9A is a top view of the connector of the drive unit of the present disclosure.
Figure 9B:
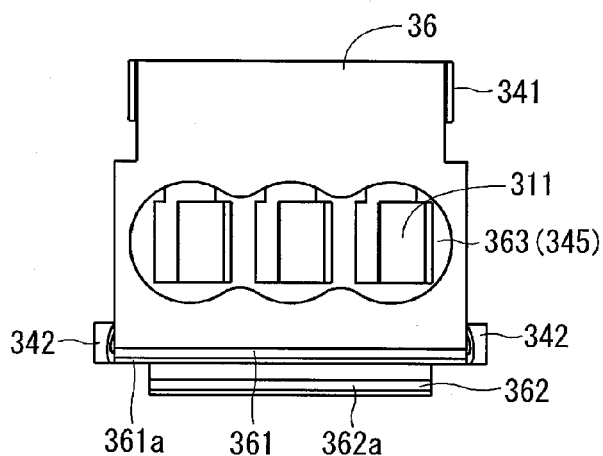
FIG. 9B is a front view of the connector of the drive unit of the present disclosure.
Figure 9D:
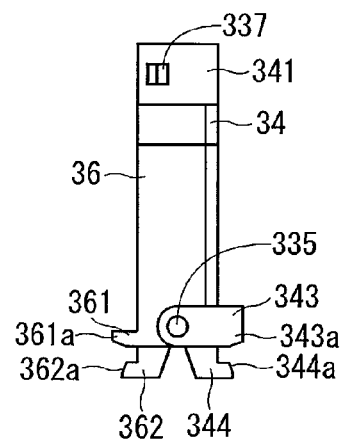
FIG. 9D is a side view of the connector of the drive unit of the present disclosure.
Figure 9C:
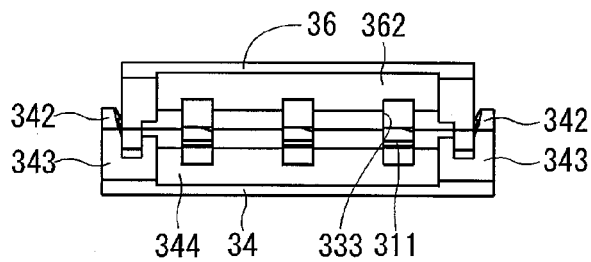
FIG. 9C is a bottom view of the connector of the drive unit of the present disclosure.

The structure of the connector 30, which connects the power board terminal 371 to the motor wire 23 is described with reference to FIGS. 8A-9D. FIGS. 8A and 8B illustrate a perspective view of the terminal 31 of the connector 30, and FIGS. 8C and 8D illustrate a perspective view of the terminal holder 33. FIG. 9A illustrates a top view of the connector 30, where the terminal 31 is held in the terminal holder 33, FIG. 9B illustrates a front view of the connector 30, FIG. 9C illustrates a bottom view of the connector 30, and FIG. 9D illustrates a side view of the connector 30.

With reference to FIGS. 8A-8C, the terminal 31, which may be made of metal, has the base portion 311 for receiving and fixedly coupling to the motor wire 23. In addition, the engaging unit 312 engages with an end of the power board terminal 371. One terminal 31 may couple with three motor wires 23 and with three power board terminals 371. The cross-section of the base portion 311 is provided substantially in a "U" shape, and the engaging unit 312, which is on the opposite side of the terminal 31 relative to the base portion 311, has an insertion slit 315 into which an end of the power board terminal 371 is inserted. The insertion slit 315 is formed by two flat plates facing each other, and the two flat plates are biased against each other by an elastic force of the material that forms the terminal 31. The end of the power board terminal 371 inserted into the insertion slit 315 is bound by the two facing plates, accordingly, the terminal 31 engages with the power board terminal 371.

The terminal holder 33, which holds and supports the terminal 31, may substantially have a cuboid shape and may be made of resin. The terminal holder 33 includes a first holder part 34 and a second holder part 36, where the first holder part 34 and the second holder part 36 are configured to open and close at a pivot 335 disposed on a side wall 365 of the second holder part 36.

The first holder part 34 is formed substantially in the shape of a flat board. On each side end of the first holder part 34, an engager 341 and a pivot arm 342 are provided on an upper and lower portion of the first holder part 34, respectively. The engager 41 and pivot arm 342 extend from the side of the first holder part 34, and project towards the second holder part 36. The second holder part 36 has a nail 337 disposed on both sides of an upper side surface of the second holder part 36. The engager 341 engages with the nail 337 of the second holder part 36 to couple the first and second holder parts 34, 36 in the closed state. The pivot arm 342 couples with the pivot 335 of the second holder part 36, and serves as a center of rotation along which the terminal holder 33 opens and closes. In other words, the pivot arm 342 and the pivot 335 provide the center of rotation along which the first holder part 34 and the second holder part 36 couple and decouple, by way of the engager 341 and the nail 337, to open and close terminal holder 33.

The first holder part 34 has a first short protrusion 344 and a first long protrusion 343 in proximity to the pivot arm 342, where the first short protrusion 344 and the first long protrusion 343 project in a opposite direction relative to the pivot arm 342 (i.e., project from a surface that is opposite to the surface facing the second holder part 36). The first short protrusion 334 is provided below the pivot arm 342 (i.e. disposed on an opposite end of the first holder part 34 relative to the engager 341). The first short protrusion 344 has a tip face 344a that extends from the first short protrusion 344 in an opposite direction relative to the pivot arm 342. In other words the tip face 344a of the first short protrusion 344 is formed substantially in parallel with the axial direction of the terminal holder 33 when the terminal holder 33 is put in the closed state (FIG. 10B).

The first long protrusion 343 is extends from the pivot arm 342 in an opposite direction relative to the pivot arm 342 (i.e., extending from a face that is opposite to a second holder part 36 engaging face). A corner portion 343a of the first long protrusion 343 on the first short protrusion 344 side is provides as a face of the first long protrusion 343 that is substantially perpendicular to the axis of the terminal holder 33 in the open state of the terminal holder 33.

The second holder part 36 substantially has a U shape cross-section. Such shape of the second holder part 36 enables the engagement of the second holder part 36 with the first holder part 34. On one end of the side wall 365 of the second holder part 36, the nail 337 to engage the engager 341 on the first holder part 34 is formed. Further, the pivot 335 is formed on the other end of the side wall 365. As shown in FIG. 8D, the combination of the pivot 335 and the pivot arm 342 of the first holder part 34 allows the rotation (i.e., opening and closing) of first holder part 34 and the second holder part 36 around the pivot 335.

The first holder part 34 has a first short protrusion 344 and a first long protrusion 343 in proximity to the pivot arm 342, where the first short protrusion 344 and the first long protrusion 343 project in a opposite direction relative to the pivot arm 342 (i.e., project from a surface that is opposite to the surface facing the second holder part 36).

The second holder part 36 has a second short protrusion 362 and a second long protrusion 361 that extend from a surface that is opposite to the surface that faces the first holder part 34. A tip face 362a of the second short protrusion 32 is formed substantially in parallel with the axial direction of the terminal holder 33 when the terminal holder 33 is put in the closed state (see FIG. 10B). A corner portion 361a of the second long protrusion 361 on the second short protrusion 362 side is formed as a face that is substantially perpendicular to the axis of the terminal holder 33 in the open state of the terminal holder 33.

The first holder part 34 defines an opening 345 in proximity to the center of the first holder part 34. The second holder part 34 defines an opening 363 in proximity to the center of the second holder part 34. The opening 345 and the opening 362 are substantially aligned when the terminal holder 33 is in the closed state. The opening 363 has a depression 364 formed thereon, defining a hole 333 to provide a through hole between the opening 345, 363 and a lower portion of the terminal holder 33 (FIG. 9C).

Assembly steps of disposing the connector 30 on the drive unit 1 in a production process of the drive unit 1 are described with reference to FIGS. 8D, 10A-14B.

In FIG. 8D, the first holder part 34 and the second holder part 36 are coupled via the pivot 335 and the pivot arm 342, and are therefore in an opening closing enabled state.

Figure 11B:
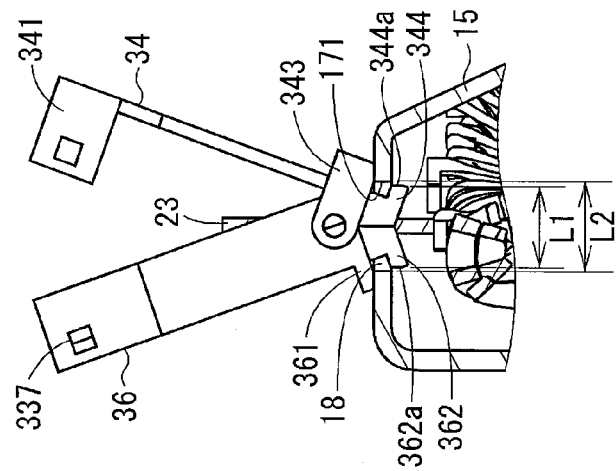
FIGS. 11A and 11B are illustrations of the assembly method of the connector of the drive unit subsequent to FIGS. 10A and 10B.
Figure 11A:
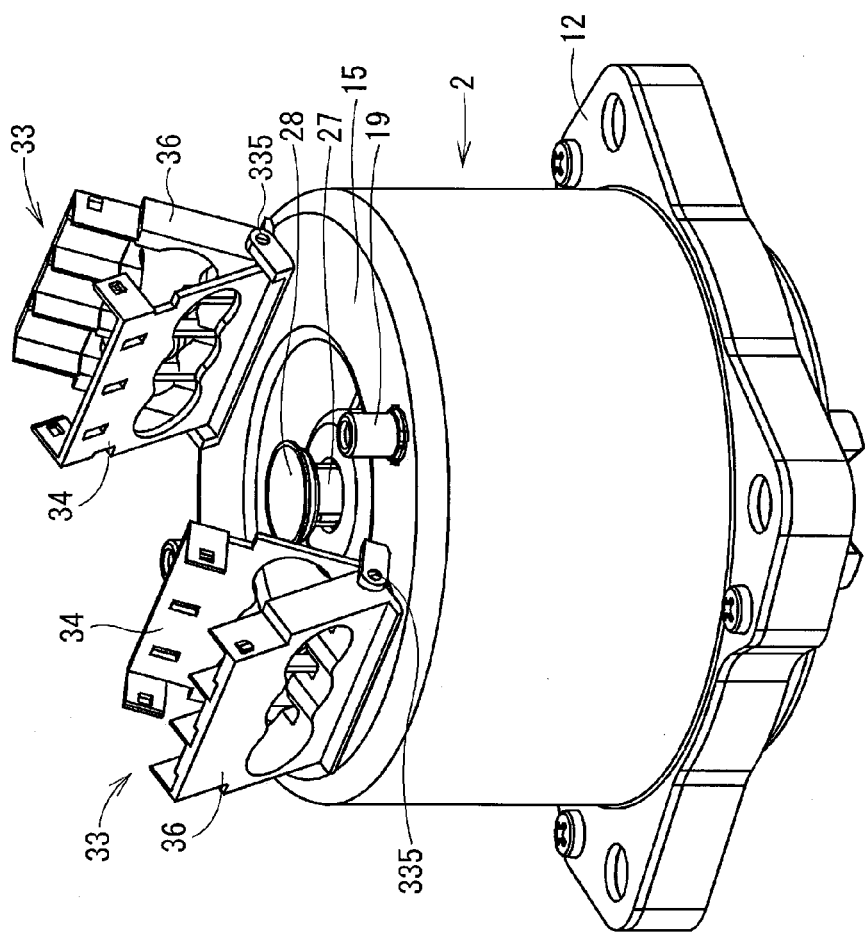

In FIGS. 10A-11B, the terminal holder 33 in the open state is inserted, from the first short protrusion 344 side and the second short protrusion 362 side, into the attachment hole 18 that is formed on the control-unit-side wall 15 of the motor case 10. As shown in FIGS. 10B and 11B, a distance L1 from the tip face 344a of the first short protrusion 344 to the tip face 362a of the second short protrusion 362 is smaller than an opening width L2 of the attachment hole 18 in a diameter direction of the motor 2. Therefore, the first short protrusion 344 and the second short protrusion 362 are inserted into the motor case 10 without touching an inner wall 171 of the attachment hole 18. Additionally, when the terminal holder 33 is placed into the attachment hole 18, the motor wire 23, which extend out from the attachment hole 18, enter the terminal holder 33 via the depression 364 formed on the second holder part 36 (FIGS. 10A-11B).

Figure 12:
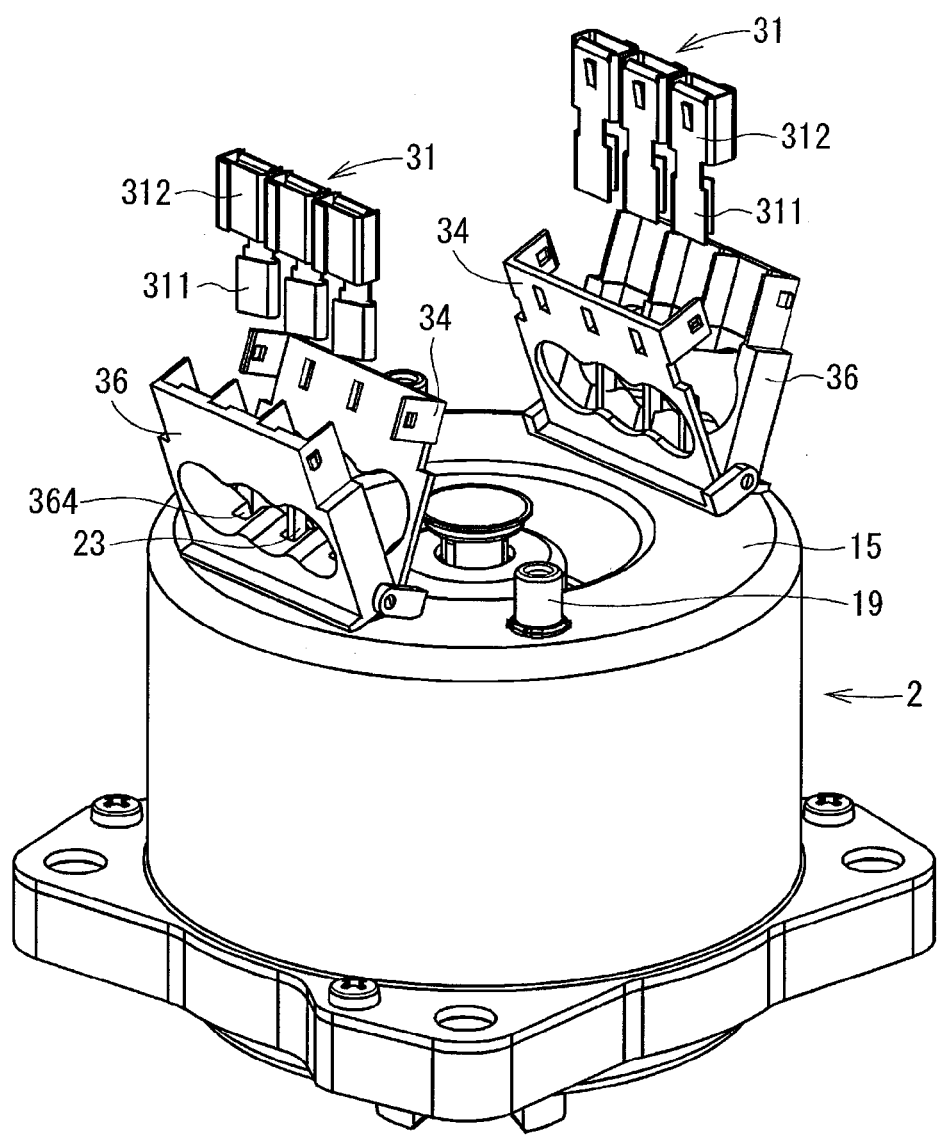
FIG. 12 is an illustration of the assembly method of the connector of the drive unit subsequent to FIGS. 11A and 11B.
Figure 13:
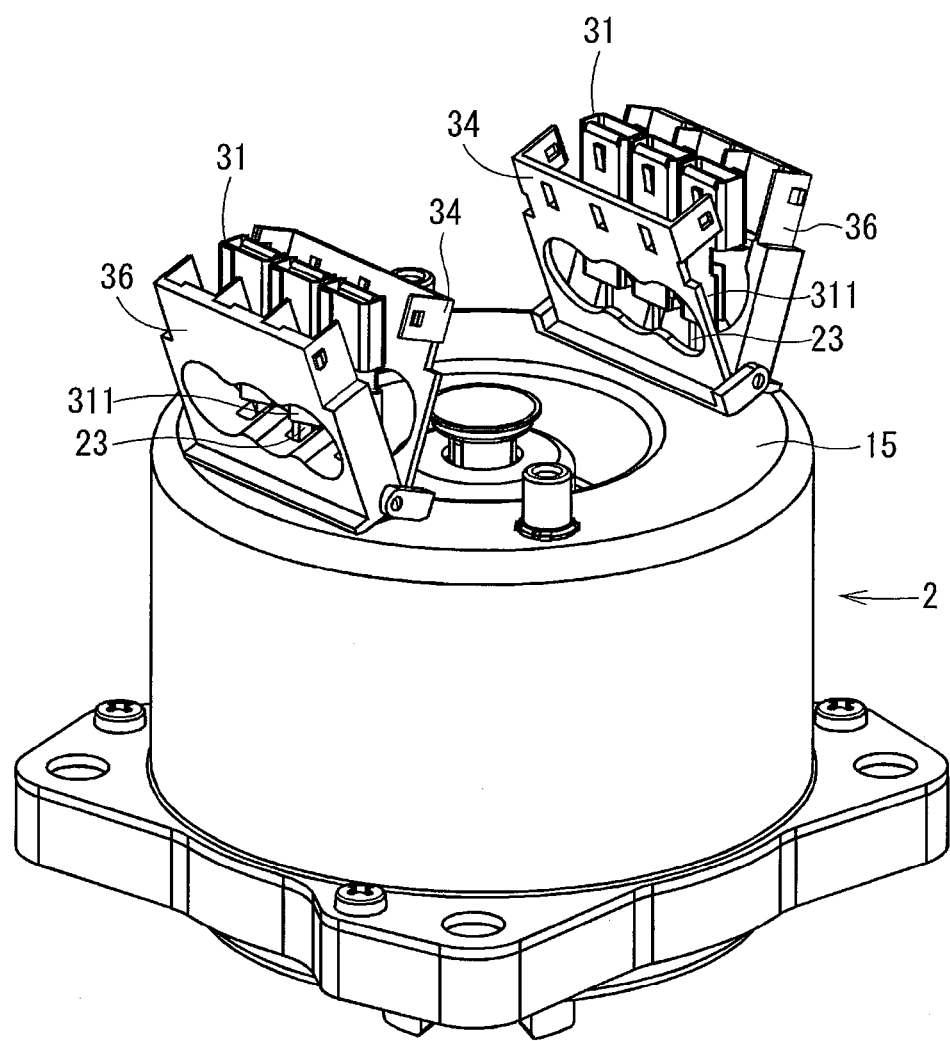
FIG. 13 is an illustration of the assembly method of the connector of the drive unit subsequent to FIG. 12.

In FIGS. 12 and 13, the terminal 31 is inserted into the terminal holder 33 that is supported by the control-unit-side wall 15. Further, as the terminal 31 is inserted into the terminal holder 33, the motor wire 23 enters the base portion 311 of the terminal 31 (FIG. 13). The motor wire 23, which extend into the base portion 311, is affixed to the base portion 311 by, for example, heat-caulking. Further, in a state that the connector 30 is fixedly attached on the motor case 10, the motor wire 23 extending into the base portion 311 of the terminal 31 is also affixed onto the base portion 311 by, for example, heat-caulking.

With reference to FIGS. 14A and 14B, the first holder part 34 and the second holder part 36 are rotated around the pivot 335 and are coupled via the engager 341 and the nail 337, thus establishing the connector 30. A distance L3 from the corner portion 343a of the first long protrusion 343 to the corner portion 361a of the second long protrusion 361 is greater than the opening width L2 of the attachment hole 18. Therefore, the terminal holder 33 is fixedly engaged with the inner edge 17 of the attachment hole 18 by the first long protrusion 343 and the second long protrusion 361.

The connector 30 is fixed on the motor case 10 by binding the inner edge 17 of the attachment hole 18 between (i) a side face 343b of the first long protrusion 343 and a side face 344b of the first short protrusion 344 and (ii) a side face 361b of the second long protrusion 361 and a side face 362b of the second short protrusion 362. In other words, the connector 30 and the motor case 10 are coupled by binding the inner edge 17 of the attachment hole 18 between the first long protrusion 343 and the first short protrusion 344, and between the second long protrusion 361 and second short protrusion 362.

Once the connector 30 is secured to the motor case 10 (FIG. 14A-14B), the control unit 3 is assembled on the motor case 10. When the control unit 3 is disposed onto the motor case 10, the connector 30 is housed in the connector accommodation space 37 of the ECU housing 120. The connector 30 in the housed state establishes the engagement between the engaging unit 312 of the terminal 31 and the power board terminal 371. Thus, the winding wire 22 and the power board 70 are coupled through the terminal 31.

(Operation of Drive Unit 1)

Here, details are discussed regarding the operation of the drive unit 1.

The microcomputer 94 on the control board 40 generates a pulse signal that is generated by pulse-width modulation (PWM) control through the pre-driver 91, based on the signals from the rotation angle sensor 93, the torque sensor 8, the shunt resistor 99, and the like, for assisting the steering operation of the steering wheel 5 according to a vehicle speed.

The pulse signal is output to the two systems of the inverters 80, 89 that are made by the power module 60 via the control terminal 64, and controls an ON-OFF switching operation of MOSs 81 to 86. In such manner, each phase of the winding wire 22 receives a sine wave electric current having a respectively different wave phase, thereby generating a rotating magnetic field. By receiving such a rotating magnetic field, the rotor 25 and the shaft 27 rotate as one body. Then, by the rotation of the shaft 27, a driving force is output from the output end 29 of the motor 2 to the gear 7 on the column shaft 6, for assisting the steering operation of the steering wheel 5 by the vehicle driver.

In other words, by the supply of the electric current for the winding wire 22, the motor 2 is driven. Thus, the electric current supplied for the winding wire 22 may be designated as a driving current to drive the motor 2.

Heat from MOSs 81 to 88 of the power module 60, which is generated during the switching operations of the MOSs, is dissipated to the heat sink 50 through the heat radiation sheet to prevent the drive unit 1 from overheating. Further, the size of the stator 20 and/or the rotor 25 may be changed depending on the required output.

(Advantageous Effects)

(A) When one of the motor 2 and the control unit 3 in the drive unit 1 is broken, the motor 2 or the control unit 3, whichever having the trouble, is replaced by removing the motor 2 from the control unit 3. According to the present embodiment, the winding wire 22 of the motor 2 and the power board 70 of the control unit 3 are electrically coupled by the connector 30. Specifically, the power board terminal 371 of the power board 70 engages with the engaging unit 312 of the connector 30. Therefore, when the control unit 3 is detached from the motor 2, the control unit 3 is released in an axial direction of the motor 2 toward an opposite side of the output end 29 of the motor 2 and a smooth separation of the control unit 3 from the motor 2 is enabled. Specifically, the decoupling of the electrical connection between the control unit 3 and the motor 2 may be performed by without the use of any special tool, since the control unit 3 is electrically coupled to the motor 2 though the engaging unit 312 of the terminal 31. In other words, the motor 2 and the control unit 3 may be easily attached and detached without the use of a special tool.

(B) The control unit 3 is disposed in an axial direction of the motor 2, on an opposite side of the output end 29. The motor 2 and the control unit 3 are attached at the column 19 by the through bolt 53 that is inserted from the cover member 110 into the cylinder member 52. Therefore, the control unit 3 may be detached from the motor 2 without detaching the motor 2 from the column shaft 6. That is, the control unit 3 may be detached from the motor 2 with the motor 2 still attached to the column shaft 6.

(C) The distance from the tip face 344a of the first short protrusion 344 to the tip face 362a of the second short protrusion 362 changes depending on whether the terminal holder 33 is in the opening state or the closed state. When the terminal holder 33 is inserted into the attachment hole 18 of the control-unit-side wall 15, the terminal holder 33 is in the open state. The distance L1 from the tip face 344a of the first short protrusion 344 to the tip face 362a of the second short protrusion 362 is smaller than the opening width L2 of the attachment hole 18 in the diameter direction of the motor 2. Therefore, the terminal holder 33 in the open state can be inserted into the motor case 10 from the first short protrusion 344 side end from the second short protrusion 362 side end.

After the terminal holder 33 is inserted into the attachment hole 18, the terminal holder 33 is positioned into the closed state by engaging the first holder part 34 with the second holder part 36. When the terminal holder 22 is in the closed state, a distance L4 from the tip face 344a of the first short protrusion 344 to the tip face 362a of the second short protrusion 362 becomes greater than the opening width L2 of the attachment hole 18 in the diameter direction of the motor 2. Therefore, when the control unit 3 is being pulled to be detached from the motor 2, the terminal holder 33 remains secured to the motor case 10 and is prevented from being pulled out from the control-unit-side wall 15.

(D) When the terminal holder 33 is inserted into the attachment hole 18, and the terminal holder 33 is put in the closed state, the distance L3 from the corner portion 343a of first long protrusion 343 to the corner portion 361a of the second long protrusion 361 becomes greater than the opening width L2 of the attachment hole 18 in the diameter direction of the motor 2. Therefore, when the terminal holder 33 is on the surface of the control-unit-side wall 15 and in the closed state, the terminal holder 33 is prevented from entering the motor case 10 via the attachment hole 18.

(E) The tip face 344a of the first short protrusion 344 and the tip face 362a of the second short protrusion 362 are formed substantially in parallel with an axial direction of the terminal holder 33. Therefore, when the terminal holder 33 is inserted in the attachment hole 18 in the open state, the tip face 344a of the first short protrusion 344 and the tip face 362*a* of the second short protrusion 362 do not touch the inner wall 171 of the attachment hole 18. Further, in comparison to having the square shape tip face, the terminal holder 33 can be inserted deeper into the motor case 10 when the tip faces of the first short protrusion 344 and the second short protrusion 362 are tilted.

(F) When the terminal holder 33 is in the open state, the corner portion 343*a* of the first long protrusion 343 on the first short protrusion 344 side and the corner portion 361*a* of the second long protrusion 361 on the second short protrusion 362 side are formed substantially perpendicular to an axial direction of the terminal holder 33 (i.e. the corner portions 343*a*, 361*a* have a slight taper). Therefore, when the terminal holder 33 is inserted into the attachment hole 18 in the open state, the terminal holder 33 is inserted deeper into the motor case 10, in comparison to having a substantially square shape corner portion on the longer protrusions.

Other Embodiments

Although the present invention has been fully described in connection with the preferred embodiment thereof with reference to the accompanying drawings, it is to be noted that various changes and modifications will become apparent to those skilled in the art.

(a) It is assumed in the above embodiments that the terminal and the motor wire are coupled by heat caulking, and the terminal and the power board terminal are coupled by insertion. However, the connection between the terminal and those parts may use a different connection method. That is, the power board terminal may be heat-caulked to the terminal, and the motor wire may be engaged with the terminal by insertion. In such case, the connector may be disposed in the ECU housing.

(b) In the above embodiment, the motor wire is disposed to the base portion of the terminal by heat-caulking. However, the motor wire may be disposed in a different manner. That is, the motor wire may be welded, soldered or the like.

(c) In the above embodiment, the terminal and the power board terminal are coupled by the engagement of the engaging unit of the terminal with the power board terminal. However, the terminal and the power board terminal may be coupled in a different manner. The power board terminal may have the engaging unit, and the terminal may be inserted into the engaging unit of the power board terminal.

(d) In the above embodiment, a corner portion of the long protrusion on the short protrusion side is formed as a face that is substantially perpendicular to the axis of the terminal holder in the open state of the terminal holder. However, the corner portion of the long protrusion may have a different form from the above. That is, the corner portion may have a face that is not perpendicular to the axis of the terminal holder.

(e) In the above embodiment, the tip face of the short protrusion is formed as a plane surface which is, in the open state of the terminal holder, in parallel with the axis of the terminal holder. However, the shape of the tip face may be formed in a different shape. That is, the tip face may be a plane surface which is, in the closed condition of the terminal holder, in parallel with the axis of the terminal holder.

Such changes and modifications are to be understood as being within the scope of the present invention as defined by the appended claims.

What is claimed is:

1. A drive unit comprising:
a motor case having a substantially cylindrical shape with a bottom wall disposed at one end, the bottom wall defining an opening;
a motor housed in the motor case and including
a stator having a plurality of winding wires corresponding to multiple phases wound thereon,
a plurality of motor wires electrically coupled to the winding wires of the stator, the motor wire extending into the opening of the bottom wall,
a rotor disposed inside of the stator, and
a shaft disposed inside of and coupled to the rotor, wherein the rotor and the shaft rotate relative to the stator as one;
a control unit disposed on one axial side of the motor and including
a semiconductor module having a switching element for switching electricity to the winding wires,
a connection terminal electrically coupled to the switching element, and
a controller case housing the semiconductor module therein;
an engaging unit disposed between the motor wire and the connection terminal and coupled to the motor wire and the connection terminal, the engaging unit providing electrical connection between the motor wire and the connection terminal; and
a hold unit holding the engaging unit in position to be coupled to the motor wire and the connection terminal to electrically couple the motor wire and the connection terminal, wherein
the hold unit is a terminal holder fixedly disposed on the opening of the motor case, the terminal holder further comprising:
a first holder part having a first short protrusion to affix on the opening of the motor, the first short protrusion extending from a side that is opposite to a connection terminal holding side; and
a second holder part having a second short protrusion to affix on the opening of the motor, the second short protrusion extending from a side that is opposite to a connection terminal holding side, and having a pivot protruding in a direction that is substantially perpendicular to the second short protrusion, wherein
the second holder part couples with the first holder part by the pivot in a rotatable manner for opening and closing the terminal holder, when the terminal holder is in an open state, the first short protrusion and the second short protrusion are insertable into the opening, and
when the terminal holder is in a closed state, the first short protrusion and the second short protrusion couple with an inner edge of the opening, and
the engaging unit is disposed in the terminal holder and is a to terminal having an engagement portion to engage with the connection terminal.

2. The drive unit of claim 1, wherein
the first holder part has a first long protrusion protruding from a side that is opposite to a connection terminal holding side at a position that is closer to a center of the first holder part relative to the first short protrusion, a projecting length of the first long protrusion being longer than a projecting length of the first short protrusion, and
the second holder part has a second long protrusion protruding from a side that is opposite to a connection terminal holding side at a position that is closer to a center of the second holder part relative to the second short protrusion, a projecting length of the second long protrusion being longer than a projecting length of the second short protrusion, wherein when the terminal holder is in the closed state, the first long protrusion and the second long protrusion abut a surface of the bottom wall.

3. The drive unit of claim 1, wherein when the terminal holder is in the open state, a tip face of the first short protrusion and the second short protrusion is substantially in parallel with an inner wall of the opening.

4. The drive unit of claim 2, wherein when the terminal holder is in the open state, an abutment face of the first long protrusion and the second long protrusion that abuts the surface of the bottom wall is substantially in parallel with the bottom wall.

* * * * *